United States Patent [19]

Eischen et al.

[11] 4,421,541

[45] Dec. 20, 1983

[54] PROCESS AND DEVICE FOR THE MANUFACTURE OF GLASS BY FLOTATION

[75] Inventors: Gaston Eischen, Stolberg, Luxembourg; Thomas Eulenberg, Aachen; Helmut Göwert, Wurselen, both of Fed. Rep. of Germany; Rainer Grablowitz, Kelmis; Michel Pernet, Brussels, both of Belgium

[73] Assignee: Saint Gobain Industries, Neuilly-sur-Seine, France

[21] Appl. No.: 218,709

[22] Filed: Dec. 22, 1980

[30] Foreign Application Priority Data

Dec. 21, 1979 [FR] France ................................ 79 31477

[51] Int. Cl.³ .............................................. C03B 18/18
[52] U.S. Cl. ..................................... 65/99.3; 65/99.6; 65/182.3
[58] Field of Search ...................... 65/99.3, 99.6, 182.3

[56] References Cited

U.S. PATENT DOCUMENTS

| | | | |
|---|---|---|---|
| 3,607,199 | 9/1971 | Itakura et al. | 65/182.3 |
| 3,737,295 | 6/1973 | Mitsuno | 65/99.3 |
| 3,771,985 | 11/1973 | Dickinson | 65/99.3 |
| 4,217,125 | 8/1980 | Dickinson | 65/99.3 |

*Primary Examiner*—Arthur D. Kellogg
*Attorney, Agent, or Firm*—Pennie & Edmonds

[57] ABSTRACT

Process for manufacture of plate glass including pouring molten glass onto a bath of molten metal (4) contained in a tank having side wall (1), an inlet wall (2) and an outlet wall (3). The glass is advanced by means to form a glass ribbon (7) and extraction means draw the ribbon in a glass drawing space (II and III). Pairs of baffles (13 and 14) are positioned in the drawing zone between each side edge of the ribbon and the side walls to limit upstream flow of cooler molten metal in a direction towards the inlet wall.

A device for manufacture of plate glass including a tank having an inlet wall (2), an outlet wall (3) and side walls (1) for holding a bath of molten metal (4) onto which molten glass is poured by feed means (6). The glass is advanced by advance means (9) in a drawing space to form a ribbon (7). Pairs of baffles (13 and 14) are positioned in the drawing zone to extend between the edges of the ribbon and the side walls to prevent upstream flow of molten metal in a direction towards the inlet wall.

15 Claims, 9 Drawing Figures

FIG_1

FIG. 2 (II-II)

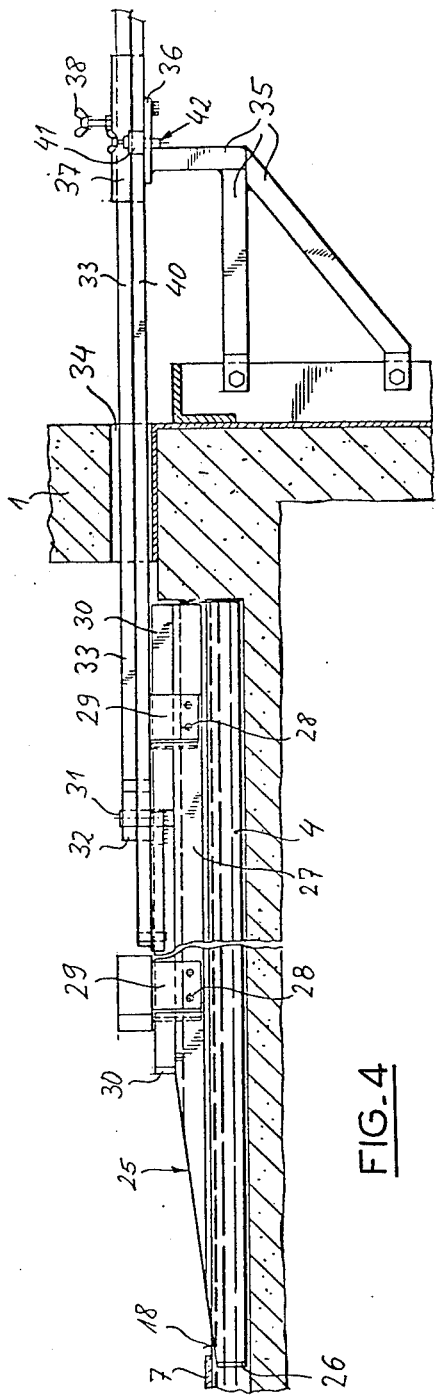
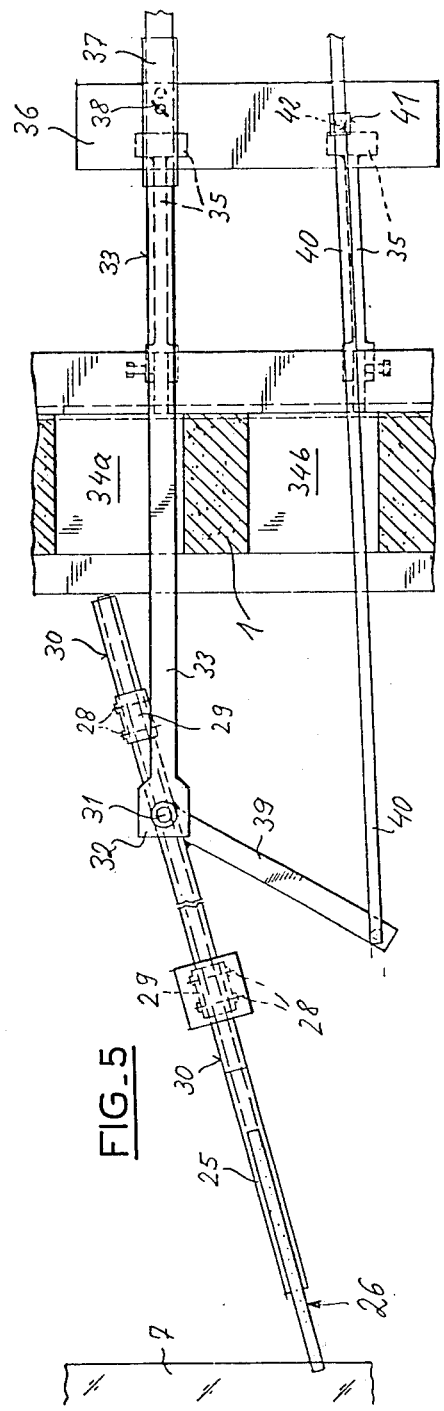

PROCESS AND DEVICE FOR THE MANUFACTURE OF GLASS BY FLOTATION

TECHNICAL FIELD

This invention relates to a process and device for manufacture of thin plate glass less than 3 mm thick by floating molten glass on a bath of molten metal.

BACKGROUND ART

In the manufacture of plate glass by flotation, molten glass is poured on a bath of melted metal, generally tin or a predominantly tin alloy, where it forms a continuous ribbon which is then cooled and extracted by means of extracting rollers that channel the ribbon into a so-called drying chamber annealing furnace.

The thickness of the glass ribbon is determined by tractice forces exerted by extracting rollers on the glass ribbon and the possible action of milled edge rolls acting on the upper edges of the glass ribbon.

In the manufacture of this glass, the glass undergoes a drawing and reaches high displacement rates of up to 15 or 30 meters per minute and more, depending on the thickness manufactured and the productivity of the device. Those high displacement rates produce under the glass ribbon a stream of molten metal directed toward the colder outlet end of the bath and described below as a downstream flow.

The molten metal carried along by the ribbon following the downstream flow strikes the outlet wall of the bath and then, by reflection, forms a return flow of cooler molten metal directed upstream and described below as an upstream flow. This upstream flow is especially great between the edges of the glass ribbon and the side walls of the bath.

The colder upstream flow of molten metal mixes with the downstream flow of molten metal producing turbulences and, in zones, high temperature variations, notably, in the drawing zone where the glass is particularly sensitive to temperature variations. Those turbulences are harmful, for they alter the viscosity of the glass and, therefore, drawing is not homogeneous. This results in deformations of the glass ribbon and also a lateral instability of the glass ribbon which is periodically displaced from one side of the bath to the other. This instability can disturb the temperatures in the drying chamber and thereby cause poor annealing of the glass ribbon and breakage.

To solve those problems, it has been proposed in French Pat. No. b 2,254,527 to set up cross barriers under the glass ribbon in order to prevent the upstream flow reflected by the outlet wall of the tank confining the bath of molten metal from mixing with the downstream flow in the drawing zone. In order to do so, a first dam is provided under the glass ribbon at the downstream end of the drawing zone. This dam only lets a part of the downstream flow run under the ribbon and forces the upstream flow to pass along the edges of the ribbon. A second dam is positioned upstream of the first dam and is situated in the region of maximum acceleration of the glass ribbon. This second dam acts in the same way as the first dam letting only a part of the downstream flow run under the glass ribbon and forcing the upstream flow to pass along the edges of the ribbon.

It has also been proposed in French Pat. No. 2,372,122 to combine with a cross barrier permanent baffles situated above the latter which serve to intercept the streams of metal skirting the side walls of the tank.

One of the disadvantages of the devices described above is that the lower part of the downstream flow strikes the cross barriers or dams under the glass ribbon to create undesirable turbulence.

It has been further proposed in French Pat. No. 2,094,030 to curb the upstream flow of metal by using linear induction motors connected to side dams set up in the zone where the glass is already congealed. The linear induction motors generate streams of molten metal running from the middle of the bath to the sides in order to be picked up by the side dams. Although the upstream flow of molten metal is partly curbed, the structure of this patent does not eliminate the lateral instability of the glass ribbon in the bath any better than previous devices. This is due, notably, to the instability of streams of molten tin to which instability must be added the inevitable periodic variations of the width of the glass ribbon which cause disturbances in the temperature pattern of the drying chamber and, consequently, as previously indicated, poor annealing of the glass ribbon and breakage losses.

It is therefore an object of our invention to provide a process and device to regulate upstream flow of cooler molten metal to improve annealing of a glass ribbon and to reduce breakage losses.

DISCLOSURE OF INVENTION

Broadly the process according to our invention involves pouring molten glass onto a bath of molten metal contained in a tank having an inlet end wall, an outlet end wall and side walls to form a glass ribbon. The ribbon is advanced towards the outlet end of the tank and extraction forces are applied to the ribbon in a glass drawing zone. The downstream flow of molten metal underneath the ribbon caused by movement of the ribbon in the direction of the outlet end of the tank is left free to run while restricting upstream flow of the molten metal by applying baffles or barriers between the side walls and the edges of the ribbon in at least the glass drawing zone of the bath.

In contrast to what has been described in the prior art, according to one of the aspects of the invention, the upstream return flow under the glass ribbon is channeled into the drawing zone of the glass ribbon.

In the process according to the invention, high temperature variations are avoided on the surface of the bath in the drawing zone and good transverse stability of the glass ribbon is obtained on the bath.

According to one characteristic of the invention, side barriers are placed symmetrical to the axis of the ribbon, which barriers, while interrupting the upstream side flows, notably, along the walls of the tank containing the bath and adjusting the temperature patterns inside the metal bath exert a hydrodynamic action on the ribbon to channel it and to give it great directional stability.

According to one application of the invention, the side flows directed upstream are interrupted, preferably almost entirely, over their entire depth, in at least three places on each side of the glass ribbon. A first interruption can take place in the downstream part of the bath, where the glass is already congealed. This interruption is then intended to reduce the upstream flow close to its source in its two side parts which are described as upstream side flows. The interruption then takes place twice in the drawing zone where it is intended to bring the bath in contact with the thermally more homogeneous glass ribbon.

According to further application of the invention, the interruption of the upstream side flows in the drawing zone may take place as many times as necessary.

Another advantage of the restrictive action on the side flows proposed by the invention, and particularly in the drawing zone, is that it makes it possible to operate the process at lower temperatures than is the case if the upstream side flows are not restricted. This results in a considerable energy saving and a reduction of heating elements. By way of indication, it is possible to economize in the order of 700 kWh in the manufacture of 600 tons of glass 2.1 mm thick. Further, owing to the stability of the ribbon and the mastery of the temperature of the bath, the number of edge rolls can be reduced.

In addition, by lowering the temperatures in the drawing zone, a more rapid congealing of the ribbon is obtained, particularly for a thin plate and, consequently, a reduction of the ratio of thickness of the edges to the thickness of the ribbon is obtained. By diminishing this ratio and, then, the extra thickness of the edges, a more homogeneous cooling is obtained, leading to a better annealing in the drying chamber.

In the process according to the invention, temperature variations on the surface of the bath and, notably, in the drawing zone are limited. On the other hand, the temperature differences of the bath immediately beneath the surface of the glass ribbon and its bottom are high. This runs counter to the prior art, one of the objectives of which was to reduce those temperature differences as much as possible between the two levels. According to the invention, temperature differences in the order of 30° C. are common in the drawing zone under the ribbon, while in the prior art those differences amounted to 10° C. at most.

In addition, the process of the invention allows the drawing zone to be shifted upstream in relation to a drawing without side barriers. The influence of the upstream flow is thereby further naturally reduced.

The invention also concerns a device for the manufacture of plate glass by flotation, and, notably, of thin plate glass. Broadly the device comprises a tank having an inlet end wall, an outlet end wall and side walls for holding a bath of molten metal. Feed means for feeding molten glass at a controlled rate onto the molten glass are included as well as advance means to advance the molten glass to form a glass ribbon. Draw means are included in a drawing zone. Barriers or baffles are provided at least in the drawing zone to restrict upstream flow of molten metal occurring between the side walls of the tank and the edges of the glass ribbon with the baffles being positioned at least in the drawing zone.

The means for interrupting upstream side flow can be baffles extending from the side walls of the tank to within short distances of the edges of the glass ribbon, e.g., to distances in the order of 10 cm and less. Those baffles, the upper edges of which generally emerge from the bath, penetrate as far as the bottom of the bath and thereby interrupt the upstream flows over their entire depth.

In one preferred and particularly advantageous embodiment of the device, the baffles are guided, being mounted on hinges, and can swing around vertical axes passing through the side walls of the tank or close to them. The baffles can thus be placed at any time in optimum active positions very close to the edges of the glass ribbon. The baffles are, however, always placed in contact with the side walls of the tanks, so that there will be no passage of molten metal between them and said side walls.

In one embodiment of the invention, the device contains at least three pairs of side baffles, preferably hinged and guidable with their position and guidance depending on the currents produced. In the manufacture of a 2-mm glass ribbon, for example, a first pair of side baffles can be placed in the downstream part of the tank where the glass is already congealed. The other two pairs of baffles are then placed in the drawing zone.

Other embodiments of the invention can include a greater number of pairs of baffles. Each baffle can have a generally rectangular shape or can present an oblique end or a break so as not to come in contact with the glass ribbon when it is very close to the midway position from the edge of the ribbon and when the ribbon undergoes a change in width in the course of manufacture which is inevitable. The end immersed in the bath can then pass slightly under the edges of the glass ribbon, it being understood that this passage will not disturb the downstream flow of molten metal.

In another embodiment of the invention the baffles can present a variable active length, being slidably mounted in the side walls of the tank or even being telescopically mounted.

The baffles are made of a material inert to the metal of the bath and to the interior temperature of the flotation furnace. They are, for example, advantageously made of graphite. Thus, in case of contact with the glass ribbon, the very low friction coefficient of graphite does not hinger the flow of the ribbon.

BRIEF DESCRIPTION OF THE DRAWINGS

FIG. 4 is a side view of a guidable baffle constructed according to the invention;

FIG. 5 is a plan view of the baffle of FIG. 4;

FIG. 7 is a plan view of a tank equipped with six pairs of baffles for the manufacture of a glass ribbon 1.5 mm thick;

FIG. 8 represents temperature curves plotted in a bath following a line along the edges of the glass ribbon, notably, in the drawing zone; and FIG. 9 represents temperature curves plotted crosswise in the bath.

BEST MODE FOR CARRYING OUT THE INVENTION

Figure 1:
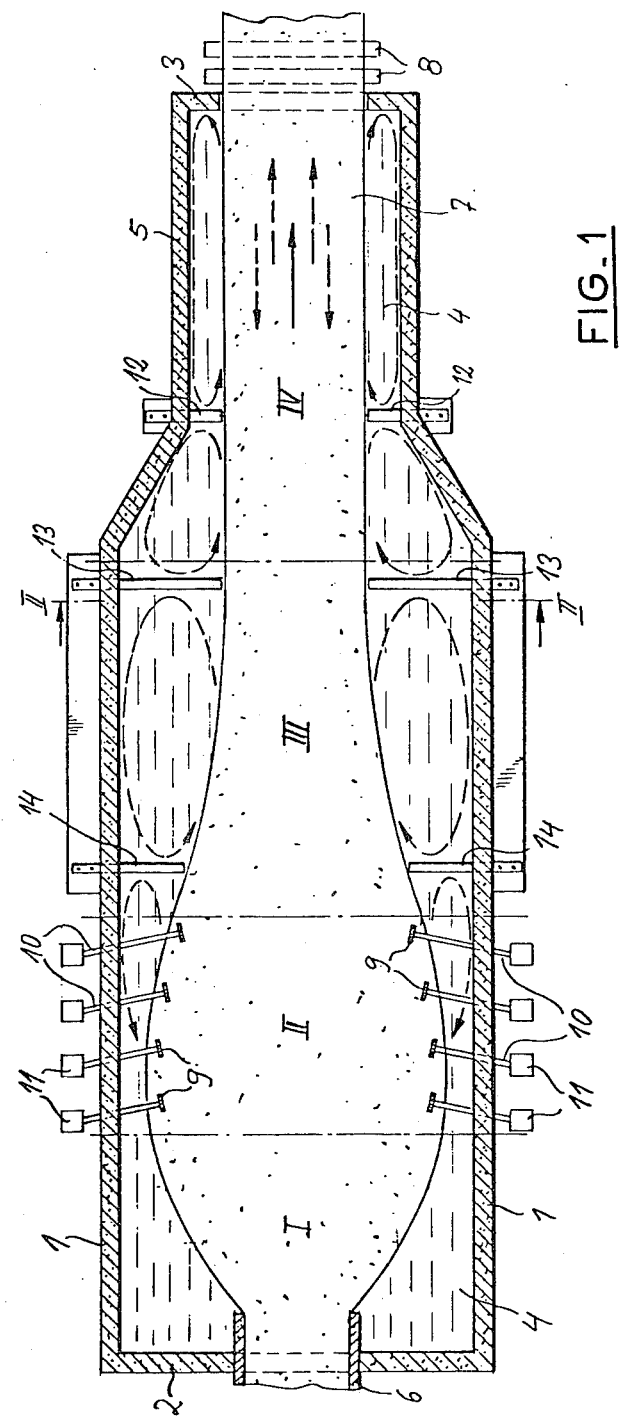
FIG. 1 is a plan view of a tank containing a bath of metal for the manufacture of thin plate glass by flotation according to the invention.

Referring to FIG. 1, there is illustrated an elongated tank for the manufacture of thin glass by flotation. The tank includes side walls 1 and end walls 2 and 3 respectively at the inlet and outlet of the tank. The tank contains a molten tin bath 4 and has a downstream part 5 of lesser width than the part adjacent the inlet.

Molten silicon-sodium-calcium is poured on the bath at the inlet end from a distributing duct 6 placed above the inlet wall 2 of the tank. The flow of glass can be regulated and attain, for example, 500 to 750 tons and more per day.

Temperature regulators, not shown, are situated above the bath. Those regulators establish the temperature pattern of the glass keeping it in deformable state to the end of a drawing zone.

The flotation bath contains for the manufacture of thin glass several zones represented on FIG. 1 and distinguishable as follows:

- a zone I for spreading of the glass after it is poured on the metal bath;
- a zone II in which the glass ribbon being formed undergoes longitudinal forces directed outwardly under the actions of extraction rollers (not shown) and edge rolls. The glass in this zone undergoes drawing and is thinned down;
- a zone III in which the glass ribbon takes its final shape under the action of the extracting rollers. Zones II and III together form the drawing zone;
- a zone IV where the congealed glass ribbon is progressively cooled.

After being poured on the molten bath, the glass is freely spread to the utmost in zone I and presents a thickness of approximately 7 mm. A ribbon 7 is thus formed which is moved downstream under the effect of traction of extraction rollers, not shown, positioned outside the tank.

The desired thickness is obtained by the combined action of traction of extracting rollers and milled edge rolls 9, which are generally steel and slightly oblique to the perpendicular to the direction of feed of the ribbon. Those edge rolls are connected by shafts 10 to motors which drive them, generally at speeds differing with their position and increasing in a downstream direction. Those rolls apply to the edges of the glass ribbon being formed forces opposing shrinkage of the glass ribbon. The glass ribbon thus undergoes drawing in the zone of these edge rolls.

The glass ribbon is then brought to the desired thickness, e.g., 2 mm, by drawing due to the extraction rollers.

The displacement of the glass ribbon in the drawing zone produces under the ribbon a flow of molten metal directed downstream in the tank in a direction from the inlet wall to the outlet wall and described as downstream flow. This downstream flow strikes the outlet wall of the tank and is reflected to form an upstream flow comprising three parts: a center part which is displaced under the glass ribbon and under the downstream flow and two side parts occurring between the side edges of the glass ribbon and the side walls of the tank which is referred to as upstream side flows. The main flows are depicted in the Figures by arrows in dotted lines.

The device according to FIG. 1 comprises, at the narrowing of the tank in the downstream part, a pair of side dams formed by two flat rectangular barriers or baffles 12 of graphite which extend, throughout the depth of the bath, from the side walls of the tank to the vicinity of the edges of the glass ribbon and thus almost totally bar the two upstream side flows due to reflection of the downstream flow on the outlet wall of the tank.

The device also comprises a second pair of side dams 13 situated at the downstream limit of drawing zone III and a third pair of side dams 14 situated at the upstream limit of drawing zone III, downstream from the last edge rolls 9. These last two side dams thermally insultate, notably, on the surface, drawing zone III, by limiting the exchange of molten metal contained in that zone with the colder molten metal originating in part from the upstream flow of molten metal remaining and the hotter molten metal in the upstream part of the bath.

The presence of the side baffles, the ends of which are in very close proximity to the glass ribbon, being spaced at a distance in the order of a few centimeters and less, produces a hydrodynamic action by channeling the glass ribbon and thereby assures its lateral stability.

Figure 2:
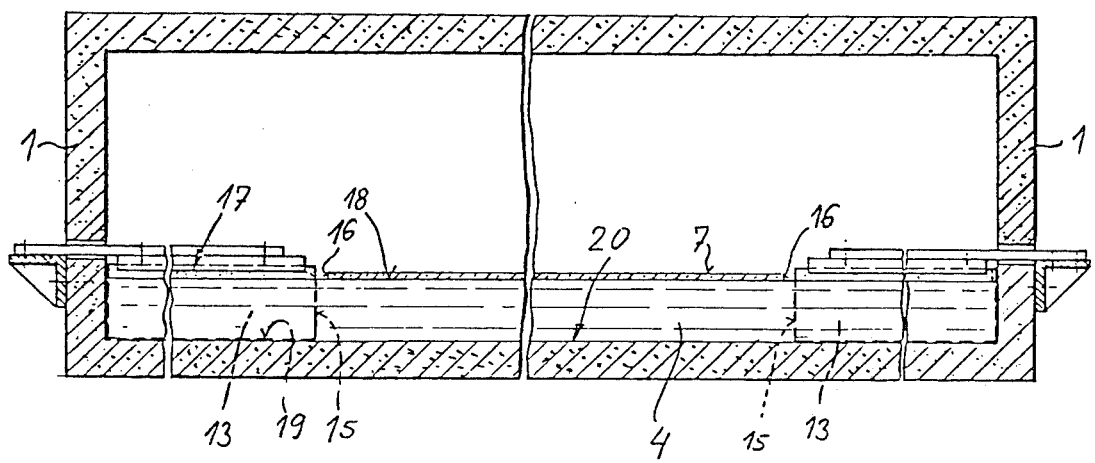
FIG. 2 is a section along line II—II of FIG. 1.

FIG. 2 illustrates in cross section the position of the side baffles in relation to the glass ribbon 7. The distances separating the ends 15 of the side baffles from the edges 16 of the glass ribbon are a few centimeters or less, so that the upstream side flows are almost totally interrupted. The side baffles come in contact with side walls 1 so that the molten metal cannot flow along these walls. The upper edge 17 of the baffles extends above the level of the bath which is indicated by line 18 while the lower edges 19 of the baffles are situated against the bottom 20 of the tank.

Figure 3:
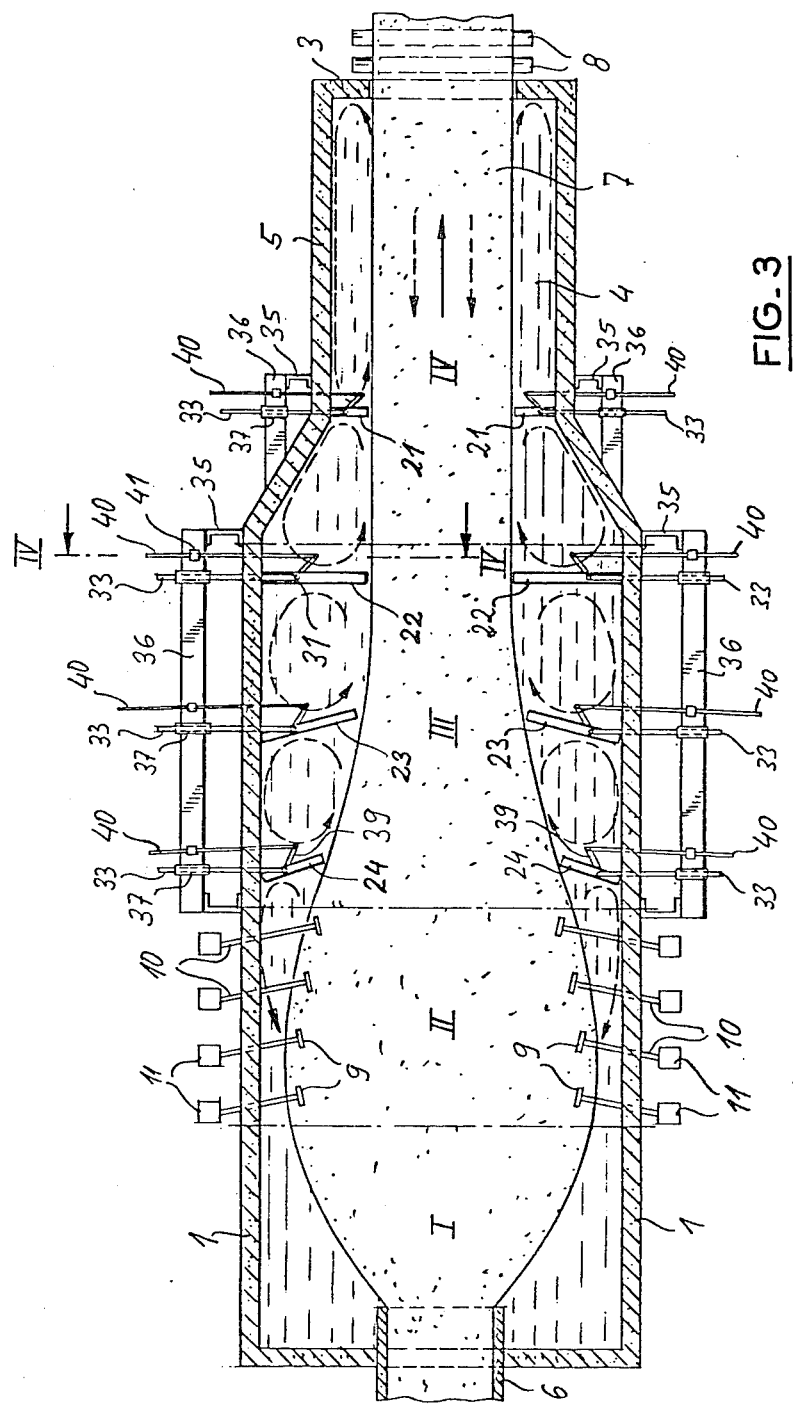
FIG. 3 is a plan view of a tank similar to that of FIG. 1 having four pairs of guidable baffles pivotable on vertical axes.

FIG. 3 illustrates an embodiment of the invention equipped with four pairs of guidable baffles pivotable on vertical axes. In this embodiment a pair of baffles 21 is arranged in zone IV at the narrowing of the bath. Three other pairs of baffles 22, 23, 24 are arranged in drawing zone III where they form cells isolated from each other. The orientation of the baffles, of given length, depends on the current of molten metal produced and on the width of the glass ribbon. The particular orientation makes it possible to assure a narrow spacing between the ends of the baffles and the edges of the glass ribbon. The orientation is generally downstream as shown on FIG. 3. Because the baffles are guidable, an optimum position can be achieved for each production run.

FIGS. 4 and 5 illustrate a guidable baffle having an oblique end 25 which is partly immersed in bath 4 so that it can pass under glass ribbon 7 in case of any variation of width of the ribbon without thereby disturbing the downstream flow of metal.

The baffle preferably comprises a graphite plate approximately 2 cm thick, reinforced on its top 27 by a thickened flange. The baffle is approximately 180 cm long and 10 cm high with the oblique end 25 having a length of approximately 50 cm. The graphite plate is fastened by screws 28 on plates 29 carried by a section 30 which is integrally mounted to a vertical pin 31 that can turn in a graphite ring 32. Ring 32 in turn is integral with a horizontal support bar 33 passing through an opening 34a in the side wall 1 of the tank containing the bath 4. The horizontal bar is mounted by means of sections 35 and a plate 36 on the outside face of the side wall and can slide in its mounting 37 so that the distance from the baffle to the wall of the tank can always be reduced to zero after the baffle has undergone a change in its inclination. A screw 38 locks the traveling motion of the bar. To control the pivoting of the baffle on pin 31, the device includes a horizontal bar 39 inclined in relation to the baffle and fastened on pin 31 is hinged to bar 39. A control bar 40 passes through an opening 342 in the side wall 1 of the tank. Control bar 40 is mounted on a vertical ring 41 capable of turning on a vertical pin passing through plate 36.

Figure 6:
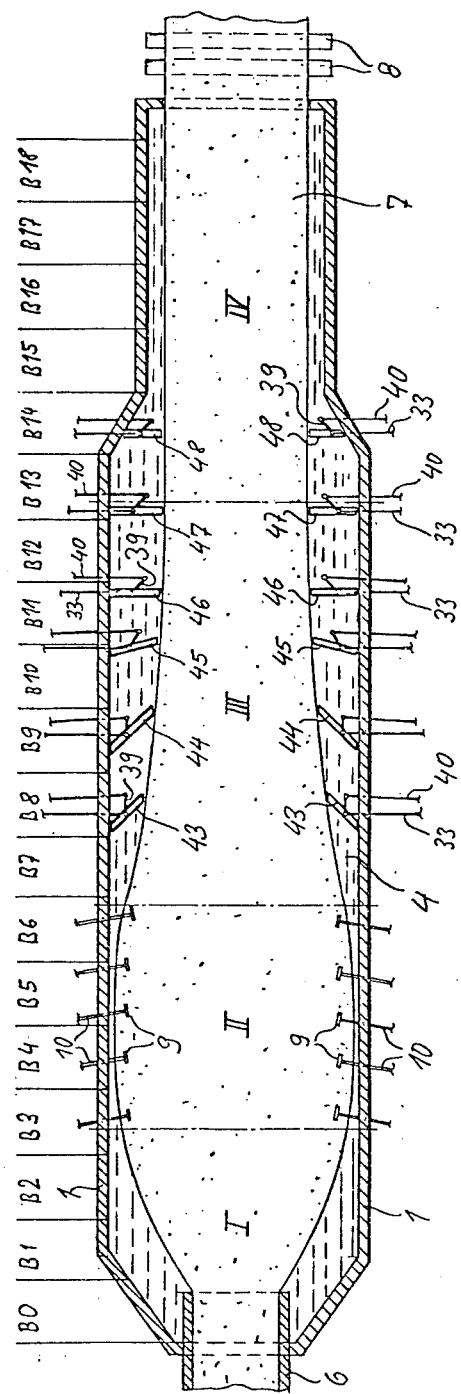
FIG. 6 is a plan view of a tank equipped with six pairs of baffles for the manufacture of a glass ribbon 2.6 mm thick.

FIG. 6 illustrates an embodiment of the invention equipped with six pairs of baffles for the manufacture of a glass ribbon 2.6 mm thick. To define their positions, the tank is divided into 19 equal spaces designated B0 to B18. Each of the spaces is further divided into 10 parts.

In the manufacture of a glass ribbon 2.6 mm thick, the device may include five pairs of edges rolls 9 arranged in zone II, formed by spaces 3 to 6. The device comprises six pairs of baffles 43, 44, 45, 46, 47, 48, the location of which, for each of them is identified by two numbers, the first number corresponding to the space and the second number to one-tenth of a space. The baffles here are at B8/1, B9/4, B10/9, B11/8, B13/1, B14/2. Five pairs of baffles are also arranged in drawing zone III and one pair in cooling zone IV where the glass is much less sensitive to temperature variations.

The first three pairs of baffles 43, 44 and 45 are oriented downstream. The angle of orientation in relation to a perpendicular to the axis of the tank depends on the width of the glass ribbon and on the lengths of the baffles which can be different. Thus length of baffles 43 can be 100 centimeters, that of baffles 44 150 centimeters, that of baffles 45 170 centimeters and that of baffles 46 and 47 180 centimeters while that of baffles 48 can be 100 centimeters.

In this embodiment of the invention, Zone II containing the edge rolls does not contain any baffles in this zone, the glass ribbon being formed is very close to the side walls of the tank and, therefore, the upstream side flows are nonexistent.

Other embodiments of the invention can, however, include baffles in zone II. These baffles will then serve to better isolate drawing zone III from the glass ribbon.

FIG. 7 illustrates an embodiment of the invention equipped with six pairs of baffles for the manufacture of glass ribbon 1.5 mm thick. As in the previous embodiment described in relation to FIG. 6, this embodiment contains six pairs of baffles arranged in the same places and the orientation of the baffles can be different. This device contains, however, two pairs of extra edge rolls 49 and 50 situated respectively at B7/6 and B2/5. The pair of baffles 43 situated farther upstream at B8/1, is therefore closer to the zone of the edge rolls II than in the embodiment of FIG. 6.

FIG. 8 represents the temperature curves of the molten tin plotted along a line following the edges of glass ribbon, notably, in the drawing zone. Curve A corresponds to the temperatures plotted in the manufacture of a glass 2.6 mm thick by means of a standard device without side dams. Curve B corresponds to the temperatures plotted in the manufacture of a glass 2.6 mm thick by use of the device described in relation to FIG. 6, i.e. equipped with six pairs of baffles. The locations of the baffles are indicated by vertical lines.

It can be seen that the placement of baffles according to the invention gives a more regular temperature curve and that these temperatures are lower than those plotted in a bath not equipped with baffles. The baffles then make it possible to work at lower temperatures and the drawing zone is shifted upstream in the tank. This is important for more than one reason as described previously. Notably, the placement of baffles yields energy savings and also a more favorable ratio of thickness of the edges to thickness of the ribbon.

FIG. 9 represents bath temperature curves plotted along a transverse line at space B9 in the drawing zone in the manufacture of glass 2.6 mm thick by use of the device described in relation to FIG. 6. Curve C corresponds to the temperatures plotted on the surface of the metal bath, while curve D corresponds to the temperatures plotted at the bottom of the metal bath.

It is to be noted that the temperature differences between the surface and the bottom of the bath are very slight in the lateral parts of the bath, on both sides of the glass ribbon 7, the position of which is represented by a line of dots and dashes. Those differences, however, are sizable and on the other of approximately 40° C. in the center part of the bath under the glass ribbon.

Streams of metal of thermal origin can thereby be created in an essentially vertical direction under the glass ribbon. Since the ribbon is solely in contact with the surface of the bath having a homogeneous temperature, those streams do not have any harmful influence on the stability of the glass ribbon.

The process according to the invention makes it possible to manufacture glass having highly variable thicknesses and, notably, thin glass less than 2 mm and even less than 1.5 mm thickness.

We claim:

1. A process for the manufacture of plate glass including the step of pouring molten glass onto a bath of molten metal contained in a tank to form a glass ribbon and where the tank has an inlet end wall, an outlet end wall, side walls and a glass drawing zone, the step of advancing the glass ribbon on the molten bath from the upstream end wall in a downstream direction towards the outlet end wall, and the step of extracting the ribbon in the glass drawing zone by applying acceleration forces thereto whereby the feeding action of the ribbon causes a downstream flow of molten metal to form beneath the ribbon and reflect to in turn form a cooler upstream flow of molten metal towards said inlet wall end between said side walls and the edges of the ribbon; the improvement comprising the additional step of restricting the upstream flow of said cooler molten metal between the edges of the ribbon and said side walls by applying a plurality of pairs of side barriers symmetrically along the ribbon and between the side walls and edges of the ribbon in the glass drawing zone where the barriers extend into the bath of molten metal while at the same time leaving the downstream flow of molten metal unrestricted whereby any continuous upstream flow of cooler molten metal between the edges of the glass ribbon and said side walls between adjacent pairs of side baffles over the length of the drawing zone is substantially eleiminated to in turn reduce turbulence in the bath due to temperature differences.

2. A process according to claim 1 wherein said side barriers are applied at least three times on each edge of said ribbon.

3. A process according to claim 2 wherein said side barriers are applied at least two times on each edge of said ribbon in said glass drawing zone.

4. A process according to claim 2 wherein said side barriers are applied at least once in a portion of the bath where the glass is congealed.

5. A process according to claim 1 wherein temperature differences between the surface of the bath and the bottom of the bath beneath said ribbon are substantial and wherein the temperature differences between the top of the bath and the bottom of the bath between the side walls and the edges of the ribbon are negligible.

6. Apparatus for the manufacture of plate glass comprising a tank for holding a bath of molten metal having an inlet end wall, an outlet end wall and side walls, feed means for feeding molten metal at a controlled rate to said bath adjacent the inlet wall end, advance means for advancing the molten glass on the surface of said bath to form a glass ribbon, and draw means in a glass drawing zone of the tank for drawing the glass ribbon; the improvement comprising in having an unobstructed space between the bottom surface of the ribbon and the bottom of the tank and in having a plurality of pairs of baffles symmetrically arranged on each side of the ribbon in a glass drawing zone where the baffles extend into the bath and from the side walls to substantially the edges of the glass ribbon to prevent upstream flow of molten metal in the direction of the inlet end wall between the edges of the glass ribbon and said side walls between adjacent pairs of baffles over the length of the drawing zone whereby turbulence in the bath due to temperature differences is reduced.

7. Apparatus according to claim 6 further characterized in that an end of each baffle contacts a side wall.

8. Apparatus according to claim 6 further characterized in that each baffle extends over the entire depth of the bath.

9. Apparatus according to claim 6 further characterized in having at least three pairs of baffles.

10. Apparatus according to claim 6 further characterized in that at least one pair of baffles are guidable.

11. Apparatus according to claim 6 further characterized in that all said baffles are guidable.

12. Apparatus according to claim 6 wherein said baffles are made of graphite.

13. Apparatus according to claim 6 further characterized in that there are at least two pairs of baffles in the drawing zone.

14. Apparatus according to claim 6 further characterized in that the ends of the baffles adjacent the edges of the glass ribbon are spaced less than 10 cm from said edges.

15. Apparatus according to claim 6 further characterized in that the ends of each baffle is oblique and adapted to extend below an edge of said glass ribbon.

* * * * *